US012769724B2

(12) United States Patent
Shah et al.

(10) Patent No.: US 12,769,724 B2
(45) Date of Patent: *Oct. 20, 2026

(54) SYSTEMS AND METHODS FOR ZERO DOWNTIME TOPOLOGY UPDATES FOR DISTRIBUTED DATA STORAGE

(71) Applicant: Stripe, LLC, South San Francisco, CA (US)

(72) Inventors: Hemal Shah, Sunnyvale, CA (US); Shashi Madappa, Campbell, CA (US); Karan Vohra, Sammamish, WA (US)

(73) Assignee: Stripe, LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/041,282

(22) Filed: Jan. 30, 2025

(65) Prior Publication Data

US 2025/0173327 A1 May 29, 2025

Related U.S. Application Data

(63) Continuation of application No. 18/214,205, filed on Jun. 26, 2023, now Pat. No. 12,242,465.

(51) Int. Cl.

*G06F 15/16* (2006.01)
*G06F 16/21* (2019.01)
*G06F 16/23* (2019.01)
*G06F 16/27* (2019.01)

(52) U.S. Cl.

CPC ........ *G06F 16/2379* (2019.01); *G06F 16/211* (2019.01); *G06F 16/27* (2019.01)

(58) Field of Classification Search

None

See application file for complete search history.

(56) References Cited

U.S. PATENT DOCUMENTS

| | | | | |
|---|---|---|---|---|
| 7,451,359 | B1 * | 11/2008 | Coekaerts ............... | H04L 43/10 709/224 |
| 9,471,585 | B1 * | 10/2016 | Theimer ............... | G06F 3/0641 |
| 2023/0055658 | A1 | 2/2023 | Yao et al. | |
| 2023/0127387 | A1 | 4/2023 | Bono et al. | |
| 2023/0198860 | A1 | 6/2023 | Bothwell et al. | |

OTHER PUBLICATIONS

Non-Final Office Action received for U.S. Appl. No. 18/214,205, mailed on Jul. 30, 2024, 10 pages.

Notice of Allowance received for U.S. Appl. No. 18/214,205, mailed on Nov. 20, 2024, 9 pages.

* cited by examiner

*Primary Examiner* — Alex Gofman

(74) *Attorney, Agent, or Firm* — BAKERHOSTETLER

(57) ABSTRACT

A method and apparatus for updating data router nodes in a distributed storage system are described. The method can include querying, by a first database agent of a database node, a cache data store for health status metrics of the cache data store. The method can also include storing, by the first database agent of the database node, the health status metrics in a data repository. Furthermore, the method can include obtaining, by a second database agent of a router node, the health status metrics from the data repository, and updating, by the second database agent of the router node, a database topology file based on the health status metrics.

20 Claims, 6 Drawing Sheets

SYSTEMS AND METHODS FOR ZERO DOWNTIME TOPOLOGY UPDATES FOR DISTRIBUTED DATA STORAGE

CROSS-REFERENCE TO RELATED APPLICATION

This application is a continuation of U.S. patent application Ser. No. 18/214,205, filed Jun. 26, 2023, the specification of which is incorporated herein by reference in its entirety.

BACKGROUND

Service provider systems provide various services to user systems over computing networks. The services provided can include commercial transaction processing services, media access services, customer relationship management services, data management services, medical services, etc., as well as a combination of such services. Modern computing techniques employed by many service provider systems typically involve deploying the functions of the service provider systems as distributed services. That is, each service may be responsible for a discreet set of functions, and the services and associated functions operate autonomously or in conjunction with one another as a whole to provide the overall functionality of a service provider system. By dividing the overall functionality of service provider systems in this way, the services may be distributed to different computing systems, multiple instances of the same services used concurrently, etc. to adapt to system load, network connectivity issues, instances of services going down, as well as other technical challenges with implementing distributed service provider systems.

In each of the above service provider systems, users of a service provider system will typically interact with the service provider system via transactions. For example, a user may make a transaction request for one of many types of transactions supported by the service provider system. Then, the one or more of the services of the distributed service provider system will perform functions of the service provider system to implement the originally requested transaction of the user. For example, the transaction may be a financial processing transaction, a media access transaction, a telecommunications transaction, etc., and one or more services of the service provider system are invoked to process a user's requested transaction.

During each of the operations performed by the service provider system during performance of a transaction, the services of the service provider system may generate and store, or seek to access stored, data associated with the service, the transaction, or other data. The data may include data associated with transaction bookkeeping purposes, record keeping purposes, regulatory requirements, end user data, service system data, third party system data, as well as other data that may be generated or accessed during the overall processing of the transaction. The service provider systems may perform millions, billions, or more transactions per hour, day, week, etc., resulting in an enormous scale of data generation and access operations of the services of the service provider system.

To efficiently perform transactions by the services of the service provider system, many technical challenges arise. For example, distributed services provider systems typically employ distributed storage techniques for storing the enormous amounts of data generated and accessed during transactions. Thus, how the data is stored among storage locations, tracking where specific data is stored, tracking what data storage locations are currently available, and routing data storage and access requests to the appropriate storage locations is technically challenging. Furthermore, if changes to storage occur and data access and/or storage fails, the service provider system will experience downtime. Downtime can impact how the service provider system operates (e.g., lost opportunity to provide transaction processing services), and further can also negatively impact end-user perception of the service provider system. As a result, the storage and access to such data should be as fast as possible and not subject to downtime.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
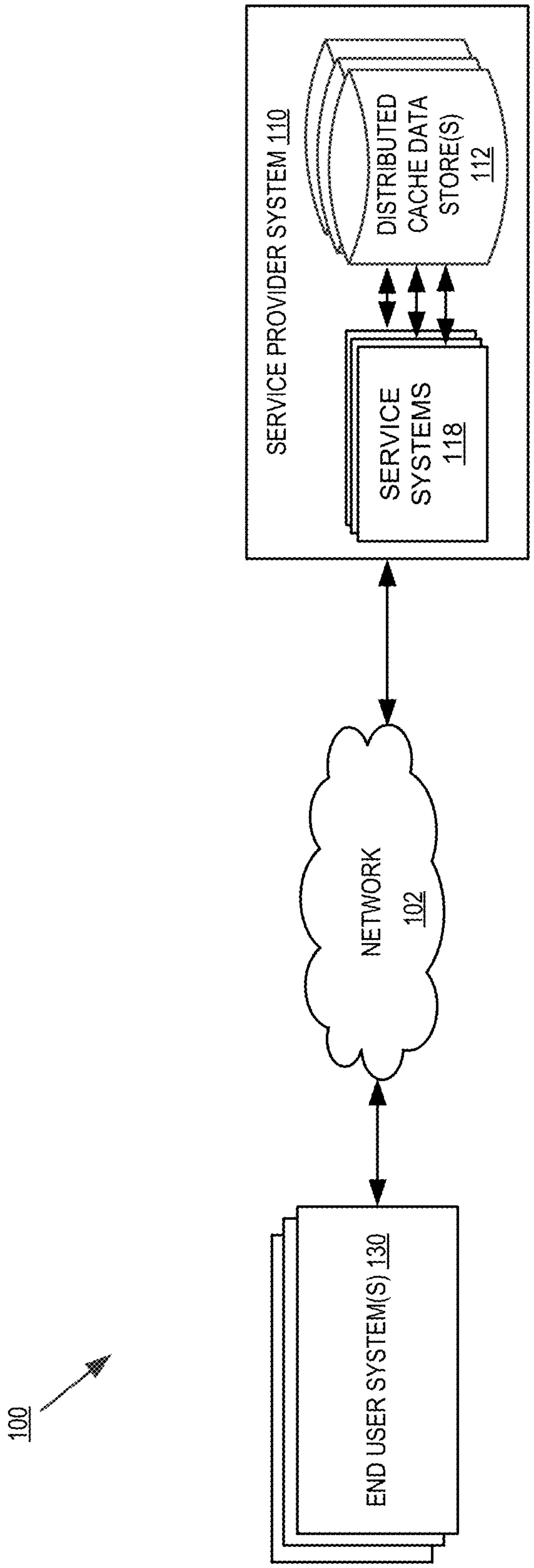
FIG. 1 is a block diagram of an exemplary system architecture for a service provider system that provides zero downtime topology updates for distributed data storage.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "updating", "querying", "storing", "obtaining", "instructing", "loading", "resuming", "receiving", "deleting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a service provider system that provides zero downtime topology updates for distributed data storage. In one embodiment, the system architecture 100 includes service provider system 110 and one or more end user system(s) 130. In one embodiment, one or more of the end user system(s) may be mobile computing devices, such as a smartphone, tablet computer, smartwatch, etc., as well computer systems, such as a desktop computer system, laptop computer system, server computer systems, etc. The service provider system 110 and one or more of the end user system(s) 130 may also be one or more computing devices, such as one or more server computer systems, desktop computer systems, etc.

The embodiments discussed herein may be utilized by a plurality of different types of service provider systems, such as commerce platform systems including payment processing systems, card authorization systems, banks, and other systems seeking to perform zero downtime topology updates of distributed data stores, as discussed in greater detail below. Furthermore, any system seeking to store data in a distributed fashion and perform zero downtime topology updates, such as medical information systems, customer relationship management systems, media storage and distribution systems, etc. may use and/or extend the techniques discussed herein to perform zero downtime topology updates. However, to avoid obscuring the embodiments discussed herein, the operations and techniques for zero downtime topology updates in a distributed storage system may use examples of a commerce platform service provider system to illustrate and describe the embodiments of the present invention, and are not intended to limit the application of the operations and techniques described herein from applicability to other systems.

The service provider system 110 and end user system(s) 130 may be coupled to a network 102 and communicate with one another using any of the standard protocols for the exchange of information, including secure communication protocols. In one embodiment, one or more of the service provider system 110 and end user system(s) 130 may run on one Local Area Network (LAN) and may be incorporated into the same physical or logical system, or different physical or logical systems. Alternatively, the service provider system 110 and end user system(s) 130 may reside on different LANs, wide area networks, cellular telephone networks, etc. that may be coupled together via the Internet but separated by firewalls, routers, and/or other network devices. In one embodiment, service provider system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, service provider system 110 provides financial processing services to one or more merchants, such as end user system(s) 130. For example, service provider system 110 may manage merchant accounts held at the commerce platform, run financial transactions initiated at end user system(s) 130, clear transactions, performing payouts to merchant and/or merchant agents, manage merchant and/or agent accounts held at the service provider system 110, as well as other services typically associated with commerce platforms systems such as, for example, STRIPE™. Each of these functions may be carried out by one or more service system(s) 118 of the service provider system 110. That is, service provider system 110 divides the services it provides to end user among one or more service systems(s) 118 so that the processing of the services may be distributed. Such distribution of service processing enables service provider systems to scale based on load, demand, hardware issues, geographic needs, expanded service offerings, as well as for other reasons.

In embodiments, end user system(s) 130 access the services of service provider system 110 by network based messaging, such as application programming interface (API) based messaging where remote calls of end user system(s) 130 request a service by messaging the request to one or more of the service systems 118. The service systems 118 in turn, and in order to execute the requested service, may generate messages to other service systems 118, generate data associated with the requested service that is stored in distributed cache data store(s) 112, access data stored in distributed cache data store(s) 112 that is needed to process the requested service, or a combination of such operations. Thus, each requested service operation generates, stores, accesses, write, deletes, modified, or otherwise interacts with data stored at the distributed cache data store(s) 112. Furthermore, such data may originate from the end user system(s) 130 (e.g., user supplied data) and/or may be data associated with a requested service that is generated by a service system 118 (e.g., service generated/supplied data).

Service provider system 110 provides numerous services to end user systems(s) 130. For example, where service provider system is a commerce platform, the services may include running financial transactions for merchant end users, managing agent accounts of merchants, performing tax accounting services as a result of the various financial transactions, performing data control and management of merchant data, providing platform hosting services, as well as any other such services. Each of these services may be initiated at the request of an end user system 130, by another service 118, or a combination thereof. Furthermore, end user system(s) 130 may include a plurality of end user systems(s) that as a whole invoke the services of server system(s) 118 on the scale of millions, hundreds of millions, billions, or more service transactions per hour, day, etc. Therefore, the amount of data generated by the service systems(s) 118 is very large, and the number of data accesses by the service systems 118 is also very large. Because of this scale, in embodiments, service provider system 110 employs a distributed data storage system that utilizes in-memory cache data, illustrated as distributed cache data store(s) 112.

In embodiments, distributed cache data store(s) 112 is cache memory of a distributed data storage system, such as the Memento™ data storage system. The distributed cache data store(s) 112 are cache storage where data accesses (e.g., data being generated and stored, read, overwritten, etc.) are processed from the distributed cache data store(s) 112. In some embodiments, the distributed cache is a pool of random access memory (RAM) of multiple physical resources (e.g., computing systems that implement the service systems 118) that serves as an in-memory data store to provide fast access to the data stored within the distributed cache data store(s) 112. Furthermore, the use of a cache data storage system reduces network bandwidth consumption, as data accesses are performed directly with cache memory, and not as calls/responses to/from remote database systems. For systems, such as service provider system 110 that operates at scale, the use of distributed cache data store(s) 112 to manage data accessed by the service systems 118 is therefore both beneficial to end user system(s) 130 and service systems 118 as data access requests may be handles more quickly and use less network bandwidth.

As will be discussed in greater detail below, the volume of data stored by distributed cache data store(s) 112 and the scale of data accesses by the service systems 118 requires a current and accurate topology of the distributed cache data store(s) 112. The topology, as discussed below, is a storage configuration that enable routers to determine where data is stored among distributed cache data store(s) 112. The current and accurate topology therefore serves to ensure data access requests (e.g., reads, writes, etc.) do not fail and return accurate data. Data access requests made against old or outdate topologies may delay services of the distributed service provider system 110 (e.g., when a requested service is delayed and/or rejected), cause data inconsistencies (e.g., where a data access is executed against an old or inaccurate topology), and otherwise harm the operations of the service provider system 110. Therefore, in order to ensure accurate distributed cache data store(s) 112 topology, embodiments discussed herein provide for a zero downtime topology update process for distributed data storage system.

Figure 2:
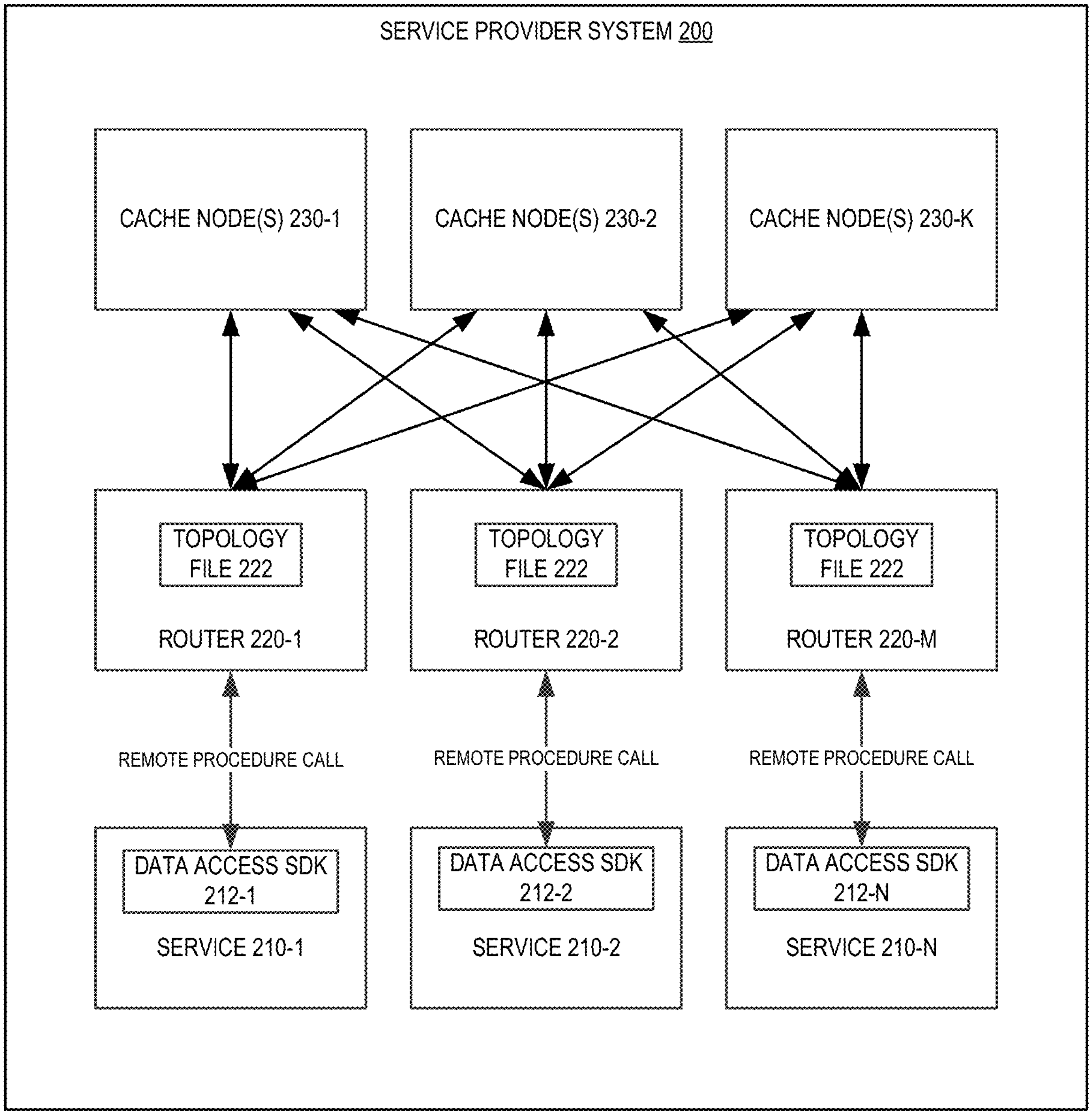
FIG. 2 is a block diagram of one embodiment of a service provider system architecture for services accessing cache data nodes via routers.

FIG. 2 is a block diagram of one embodiment of a service provider system 200 architecture for services accessing cache data nodes via routers. Service provider system 200 provides additional details for the service provider system 110 discussed above in FIG. 1.

In one embodiment, service provider system 200 includes a plurality of services (e.g., services 210-1, 210-2, through 210-N), a plurality of routers (e.g., routers 220-1, 220-2, through 220-M), and a plurality of cache data nodes (e.g., nodes 230-1, 230-2, and 230-K). The services and routers, in embodiments, are performed by processing logic that may comprise hardware (circuitry, dedicated logic, etc.), software (such as is run on a general purpose computer system or a dedicated machine), firmware, or a combination. The cache data nodes are in-memory RAM of the physical resources used to implement the services, routers, a data or computing center at which the services and routers are implemented, etc. Furthermore, in embodiments, the cache data nodes may further include logic to respond to and execute data access requests, for example those originating from the services.

Each service 210 is responsible for executing one or more functions of the service provider system 200. For example, a service 210 may respond to an end user request or command (not shown), a request or command of another service, a periodic and automatic job executed by the service, as well as other operations. As part of executing the function, the service 210 will access a data access software development kit (SDK). The data access software development kit (SDK) 212 is a set of data access functions that enable the service to read, write, or otherwise interact with data. The data access SDK may define one or more API function calls, such as get, post, put, delete, etc. that are used by the service 210 when seeking to access data of the service 210. Such function calls may be part of a data access software library, such as that provided by the Memento™ distributed data storage system.

In embodiments, service system data, such as that accessed by services 210-1 through 210-N, is stored in a distributed cache. In embodiments, the distributed cache includes cache node(s) 230-1 through 230-K. Each of the cache node(s) 230-1 through 230-N may be part of a zone of cache nodes, such as each of the cache node zones includes multiple machines providing in-memory storage at a geographic region, data center, etc. Furthermore, each cache node or zone of cache nodes may be single tenancy cluster of cache nodes, where only data of a specific service, specific end-user system, etc. are stored within the cache node or zone of cache node. In embodiments, data stored for a service or end user may be distributed amongst the nodes associated with that end user/service, and duplicate data maintained in redundant cache node(s), to ensure constant availability of data. Many node configurations are possible with the embodiments discussed herein.

The machines providing the cache node(s) 230 are physical machines, virtual machines executing on a single physical machine, as well as a combination thereof. For example, a web services provider system (e.g., AMAZON WEB SERVICES™, MICROSOFT AZUL™, GOOGLE CLOUD™, IBM CLOUD™, etc.) may provide physical computing resources for services 210 and associated cache memory is pooled from those physical resources for cache node(s) 230. Each cache node 230 is therefore locatable by an identifier of the cache node, such as an internet protocol (IP) address of the cache node, indicating a location within he web services provider system's physical resources where data is stored.

In an embodiment, the cache nodes 230 provide data storage for the services 210, as discussed herein. Each cache node may store data in a tabular form, as well as other forms, accessible or indexed by data key (e.g., a value derived from or assigned to data). Then, data accesses may be implemented as key based data access requests, generated by the data access SDKs 212, with the data values locatable within the cache node(s) 230 by the associated keys. If implemented as tabular data stores, the keys may be arranged as rows of tabular data, with the associated data values of each key stored in a column for a given key's row. Then, in embodiments, a data access request generated by a data access SDK 212 may be serviced based on an IP address where data is stored and a key value of the data associated with the request.

In embodiments, routers 220 are systems in between the cache nodes 230 and the services 210. Each router 220 includes routing logic, such as the Memento™ memrouter logic, that determines where data is stored amongst the cache nodes based on topology files 222. Each topology file 222 stores, for each service and/or end user, an ordered set of IP addresses of the cache nodes where data is stored for that service/end user. Furthermore, the topology file 222 at each of the routers 220 is the same to ensure consistent routing decisions among the routers. The ordered set is predefined, includes the number of cache nodes used by the service/end user, and identifies each cache node by IP address within the given ordering. With the ordered listing of IP addresses of the cache nodes and the total number of nodes, a deterministic data distribution technique, such as the jump hash technique, is able to repeatedly calculate, based on a key and total number of nodes for a service/end user, which node in the ordered listing data to be accessed is stored at. That is, a key value and a number of nodes is input into the jump hash, which outputs a deterministic node selection. For example, if there are 3 cache nodes associated with a service, and a key value of 1234 is input with the total number of nodes, the jump hash technique will always return the same resulting node, such as node 2 for the combination of key and number of total cache nodes. The cache node associated with the position can then be used to determine it's IP address, and the associated storage location of the data associated with the key. Furthermore, the jump hash technique performs regular distribution, so that data written to nodes is distributed in an even fashion. Therefore, the topology file is a vital configuration (e.g., mapping of each service/end user (e.g., key, ID, name, etc.) to their cache nodes (IP address, clusters, regions, etc.) for handling data access requests.

In embodiments, since the topology file 222 is vital for ensuring data access requests are routed to the appropriate cache nodes, it is also vital that the topology file be current (e.g., reflect which nodes may be up/healthy, and which nodes may be down/offline) so that appropriate routing decision can be made, as discussed above. Prior approaches to defining this topology file included the manual editing of the file to define for each service/end user, what is the ordered listing of cache nodes where that service/end user has data stored. Any change to the topology file therefore also requires a manual change. This process is both slow and error prone. Furthermore, any changes to nodes, adding customers, etc. typically requires routers to be shut down, new topology files generated, and then routers restarted with updated topology files. During this time, data access requests will fail to be executed, which is not desirable for always on service provider systems.

In embodiments, an automated approach may be deployed that accurately obtains a current cache node topology, and generates and distributes real time cache node topology updates. Furthermore, the updating is performed without causing data access downtime.

Figure 3:
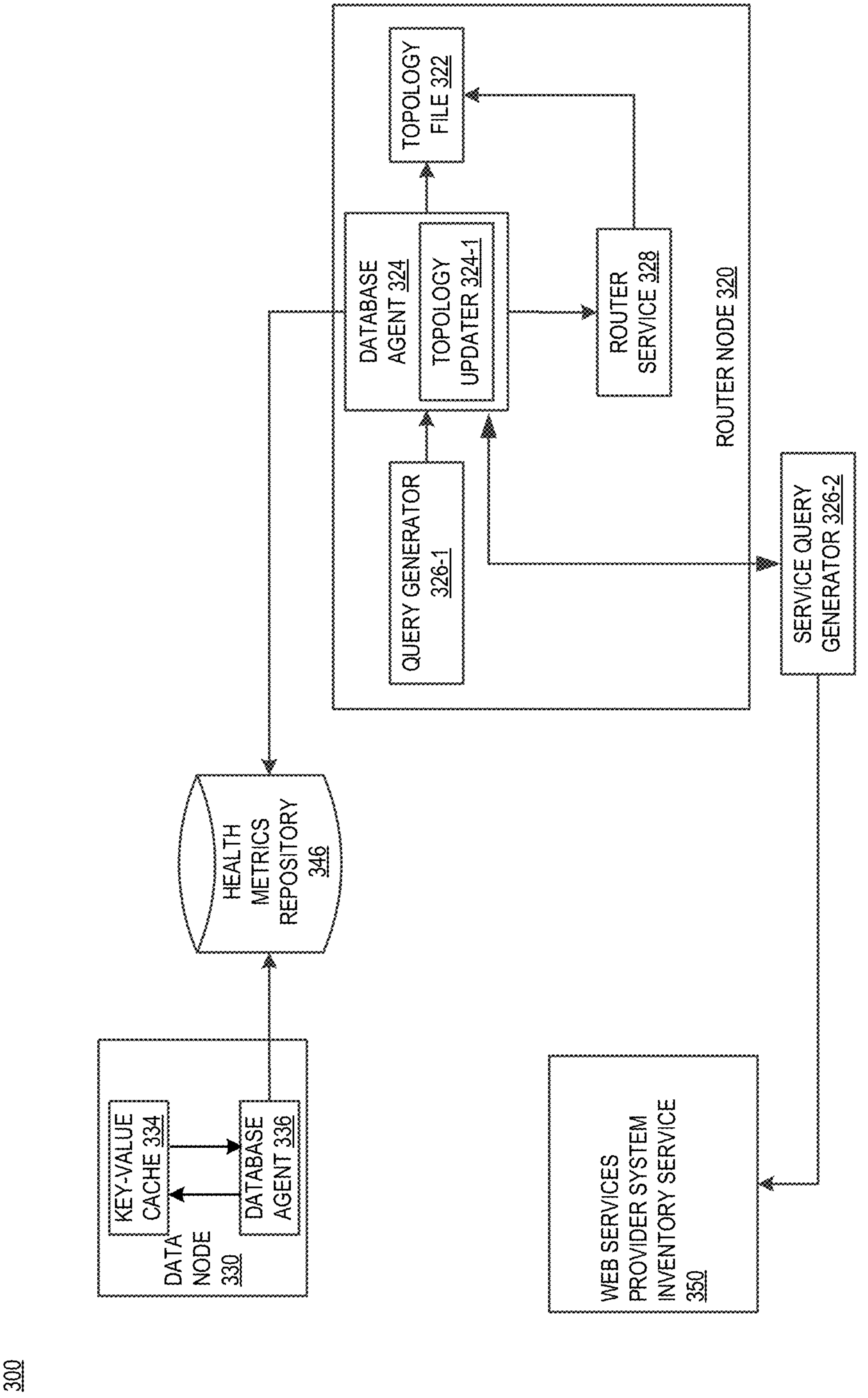
FIG. 3 is a block diagram of one embodiment of a process for a data node and a router node of a service provider system providing zero downtime topology updates.

FIG. 3 is a block diagram of one embodiment of a process 300 for a data node and a router node of a service provider system providing zero downtime topology updates. The process 300 is performed by processing logics that may comprise hardware (circuitry, dedicated logic, etc.), software (such as is run on a general purpose computer system or a dedicated machine), firmware, or a combination. In one embodiment, the process 300 is performed by processing logic executed at a router node 230, a data node 330, and a service query generator 326-2.

Furthermore, although only a single data node and router node are shown, as illustrated and discussed herein, there are a plurality of data nodes and router nodes distributed over physical resources of one or more web services providers. The router nodes may be instances of router nodes that are allocated and deallocated based on data access system loads. Furthermore, the data nodes are cache nodes distributed between one or more data centers, and in some embodiments, are grouped per service system and/or end user providing single tenancy data node clusters. However, to avoid obscuring the present invention, the illustration of FIG. 3 shows how a data node 330 and a router node 320 cooperatively perform zero downtime topology updates.

In embodiments, data node 330 is a cache data layer node (e.g., an in-memory storage) at which key-value cache 334 is maintained. Key-value cache 334 includes logic to store and access data from physical storage, such as Memento™ memcached logic that is responsible for maintaining the data store and executing data accesses to the data within the store in response to requests. As discussed above, the data node 330 is associated with an IP address defining a location of the data node within the distributed storage system. Furthermore, the data node 330 stores at least a portion of service system data for a service/end-user within the key-value cache 334.

Database agent 336 of data node 330 is a software agent running on data node 330, such as a Memento™ memcar database agent. In an embodiment, data node 330 is configured to request a health status of the key-value cache 334, such as making an API based request (e.g., put/get) to the key-value cache 334. Key-value cache 334 responsive to the request returns to database agent 336 a current health status, such as operational/non-operational, healthy/unhealthy, or some other health status indicator. Database agent 336 then reports this health status, along with a corresponding data node 330 identifier (e.g., IP address and other metadata indicative of the data node 330) to health metrics repository 346. In embodiments, the health status query and reporting performed by database agent 336 is performed periodically, such as every 1 millisecond, 100 milliseconds, 1/10 second, 1/2 second, second, every minute, or at other periodic intervals. The periodic health queries and reporting enable the database agent 336 to obtain a current and real time health of data node 330.

Health metrics repository 346 is a data store within the distributed data storage environment that stores a listing of all data nodes owned by the service provider system 110. In embodiments, as nodes, node clusters, etc. are provisioned or taken down within the distributed data storage system, a record is updated within the health metrics repository 346. Furthermore, each node's record may be updated with the health status data reported by database agent 336. As discussed herein, each data node within the distributed storage system of service provider system 110 will include a database agent and key-value cache, and the database agents collectively report data node health to health metrics repository for all data nodes. Thus, health metrics repository 346 stores a current and real-time status of all data nodes within the distributed storage system of the service provider system 110.

Query generator 326-1 is logic that initiates health status requests on a periodic basis, such as every 1 millisecond, 100 milliseconds, 1/10 second, ½ second, 1 second, 1 minute, etc. Database agent 324 of router node 320, responsive to the query generator 326-1, is responsible for sending queries to the health metrics data store 346 for health status reports of the data nodes of the distributed storage system. Database agent 324, in embodiments, is also a Memento™ memcar database agent, such as a sidecar service or a caching agent, and executes API based requests at repository 346 for health status reports.

In response to receiving the health status report, topology updater 324-1 of database agent 324 accesses topology file 322. Topology file 322, as discussed herein, is a topology of the data nodes of the distributed storage of the service provider system 110. As discussed herein, the topology includes an inventory of nodes for each service/end-user with an accompanying ordering of the nodes for each service/end-user, and the IP addresses of each data node within the ordering. Topology updater 324-1 then revises, as necessary, the topology file to indicate nodes that are not available (e.g., down, unhealthy, etc.). As a result, the updated topology file 322 generated by topology updater 234-1 will reflect a current node status of all data nodes within the distributed storage system.

After each updating of the topology file 322, database agent 324 notifies router service 328 that an update to the topology file is available. In embodiments, router service 328 is a Memento™ memrouter service, which is a service that receives and responds to data access requests from service systems. Thus, the router service 328 will use the topology file to deterministically find which data node a data access request should be directed to based on the data nodes associated with a service making a request, and an ordering of those nodes, within the topology file. As discussed herein, router service may use the jump hash technique for deterministic and even distribution of data amongst a set of ordered data nodes based on key value of data, a number of nodes associated with a service, and an ordering of those nodes.

Responsive to receiving the notification that a topology file update is available, router service 328 handles any existing requests (e.g., one received before the update of the topology file) with the older topology file. Then, router service 328 pauses any request received after the topology file update, while router service 328 loads the new topology file within the router service 328. Once loaded, router service unpauses the handling of any paused data access requests and resumes memory access service processing with the new/updated topology file configuration. In embodiments, router service 328 is therefore able to receive and respond to request throughout the topology update process without failing any requests.

Service query generator 326-2 is logic that requests from web services provider system 350 a current inventory of all data nodes of the service provider system 110. Web services provider system inventory service 350 is a service of a provider of hardware resources (e.g. processing systems, memory systems, etc.) such as Amazon Web Services™, Microsoft Azure™, Google Cloud™, IBM Cloud™, etc. Thus, web services provider system inventory service 350 is able to generate a current listing of all data nodes, including data node 330, and their current status for the data nodes at the web service provider. In embodiments, service query generator 326-2 periodically queries the web services provider system inventory service 350 for this listing. In some embodiments, the querying of web services provider system inventory service 350 is made on a different periodic basis from the database agent 336 queries. For example, such queries to web services provider system 350 are performed less frequently to preserve bandwidth at the web services provider. In this embodiment, service query generator 326-2 may then push this current inventory of all data node status to all router nodes including router node 320. Service query generator 326-2 is therefore able to act as a single point of truth for the current status of all data nodes across the distributed storage system.

In some embodiments, service query generator 326-2 is further responsible for provisioning new data nodes at the web services provider system. In a first embodiment, a data node may go down during operation (e.g., is reported as unhealthy, down, etc.). In this embodiment, service query generator 326-2 provisions the new node to replace the down/unhealthy node, and causes data associated with that node to populate the newly provisioned node (e.g., through the services of one or more routers and data nodes). In embodiments, there is an amount of data storage redundancy, which can serve to warm up the newly provisioned data node. Then, knowing the original orderings of data nodes for each service system within topology file, service query generator 326-2 may assign the newly provisioned node to the ordering and position of the downed data node. For example, if the $4^{th}$ data node in a set of data nodes goes down, a newly provisioned data node with a new IP address and warmed up to store the data of the downed node can be specified to take the 4th position within the ordered set of data nodes. Subsequent data access requests, although serviced by the new node will continue to be satisfied correctly according to the jump hash technique employed by the router services of the various router nodes.

In some embodiments, service query generator 326-2 is further responsible for adding or removing one or more data nodes to/from an existing set of data nodes associated with a service system. For example, due to increased load or decreasing storage capacity, a service may request that one or more additional data nodes be provisioned. In this embodiment, service query generator 326-2 would provision N+M new data nodes, where N is the current number of nodes and M is a positive integer corresponding to the request number of data nodes to be added. The provisioning ordering associated with how the web services provider provisions the data nodes could serve, in embodiments, as the ordering in the topology file. Other orderings, such as numerical, geographic, etc., could also be used to set an ordering of a listing of newly provisioned nodes. Once provisioned, service query generator 326-2 would instruct one or more router nodes and data nodes to warm up (e.g., populate) the newly provisioned nodes with the data from the old set of data nodes, and distribute the data using key values of data, ordering of the new set of data nodes, and the total number of new data nodes. A complimentary process to that discussed above can be carried out when a data node is removed from an existing set of data nodes. Then, once newly provisioned set of data nodes are warmed up, service query generator 326-2 sends a topology update to all database agents that replaces the decommissioned set of data nodes with the topology for the newly allocated and warmed up N+M data nodes.

Figure 4:
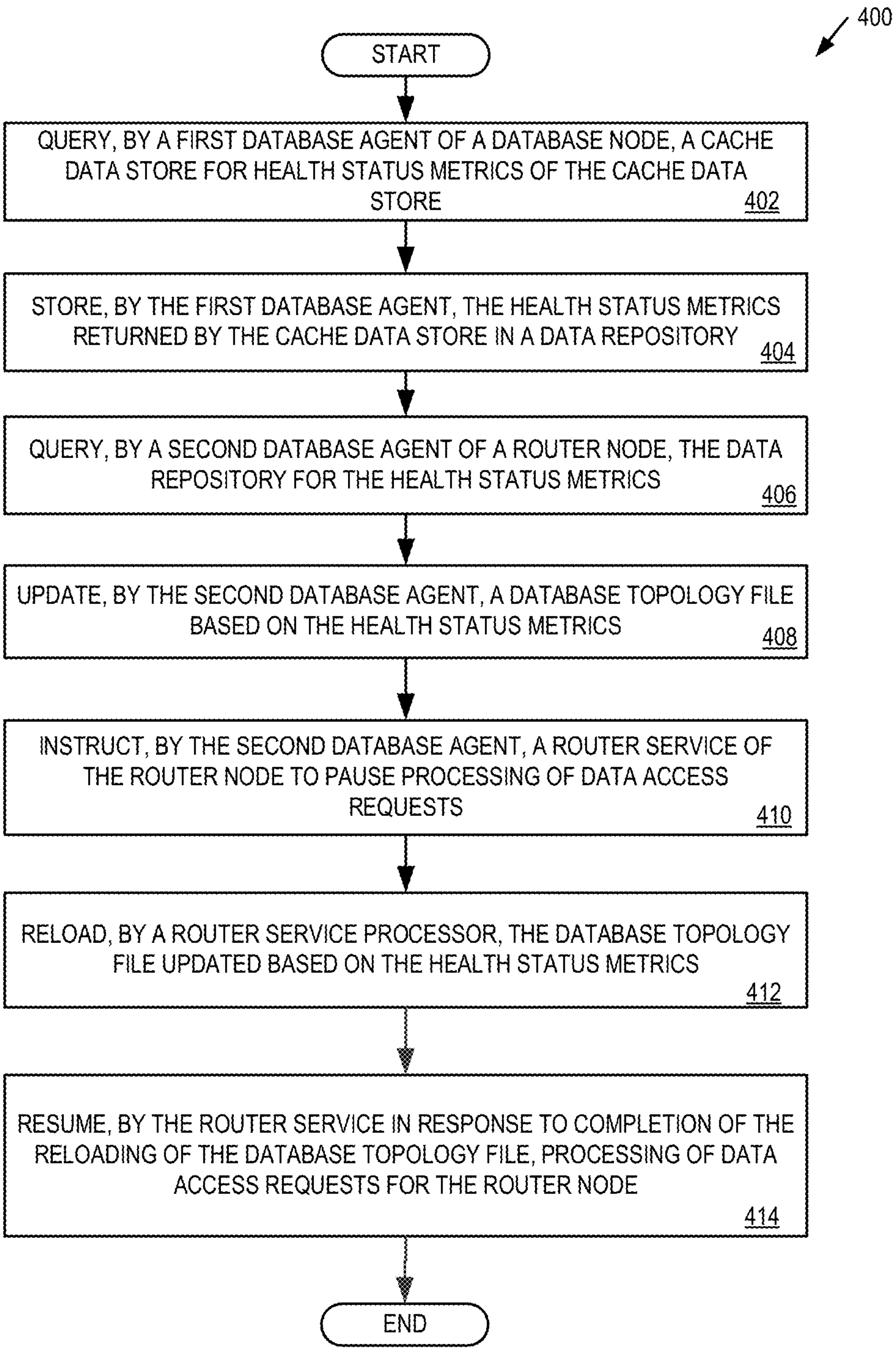
FIG. 4 is a flow diagram of one embodiment of a method for updating a distributed cache storage topology for a distributed cache nodes in a service provider system.

FIG. 4 is a flow diagram of one embodiment of a method 400 for updating a distributed cache storage topology for a distributed cache nodes in a service provider system. The method 400 is performed by processing logic that may comprise hardware (circuitry, dedicated logic, etc.), software (such as is run on a general purpose computer system or a dedicated machine), firmware, or a combination. In one embodiment, the method 400 is performed by data node (e.g., data node 330) and a router node (e.g., router node 320).

Referring to FIG. 4, processing logic begins by querying, by a first database agent of a database node, a cache data store for health status metrics of the cache data store (processing block 402). As discussed herein, the querying is periodic (e.g., every x milliseconds, every y seconds, etc.) and can include an API based message requesting the health status metrics. Furthermore, the health status metrics can include whether the data nodes is currently healthy, operations, down, etc. Processing logic stores, by the first database agent, the health status metrics returned by the cache data store in a data repository (processing block 404). The storage may be accomplished by an API based message generated by the database agent and transmitted to the data repository. In embodiments, the data store is a common data store where a plurality of database agents report health status to, forming an overall current health status of all data nodes/cache storages in a distributed data storage system Processing logic queries, by a second database agent of a router node, the data repository for the health status metrics (processing block 406). As discussed herein, the query may be an API based query for the health status metrics of all data nodes within the distributed storage system. Furthermore, the querying by the second database agent may also be periodic on the same or different frequency as the querying of the first database agent.

Processing logic updates, by the second database agent, a database topology file based on the health status metrics (processing block 408). The topology file, as discussed herein, defines for each service provider system and/or end user system, a cluster of data nodes including their address (IP), and their ordering. Router services may then use a consistent jump hash determination based on the number of nodes in a cluster, the defined ordering within the cluster, and a data key, to determine which data node data is stored on, and route requests accordingly. Thus, the updating can include changing node status metadata within the topology file to reflect a current health status of nodes for which health status has changed. For example, if a node is listed as down, then a router could alter how a data access request is fulfilled (e.g., by fulfilling a request with a redundant copy of data). Furthermore, down nodes are used by service query generator 326-2 to provision and replace nodes in a topology file.

Processing logic instructs, by the second database agent, a router service of the router node to pause processing of data access requests (processing block 410). By pausing the data access requests, data access requests are not failed during the updating. Furthermore, data access requests are not executed against a potentially incorrect and outdated data node topology (e.g., with a down or unhealthy data node unable to respond to data access requests). Processing logic reloads, by a router service processor, the database topology file updated based on the health status metrics (processing block 412), and resumes, by the router services in response to completion of the reloading of the database topology file, processing of data access requests for the router node (processing block 414).

Figure 5:
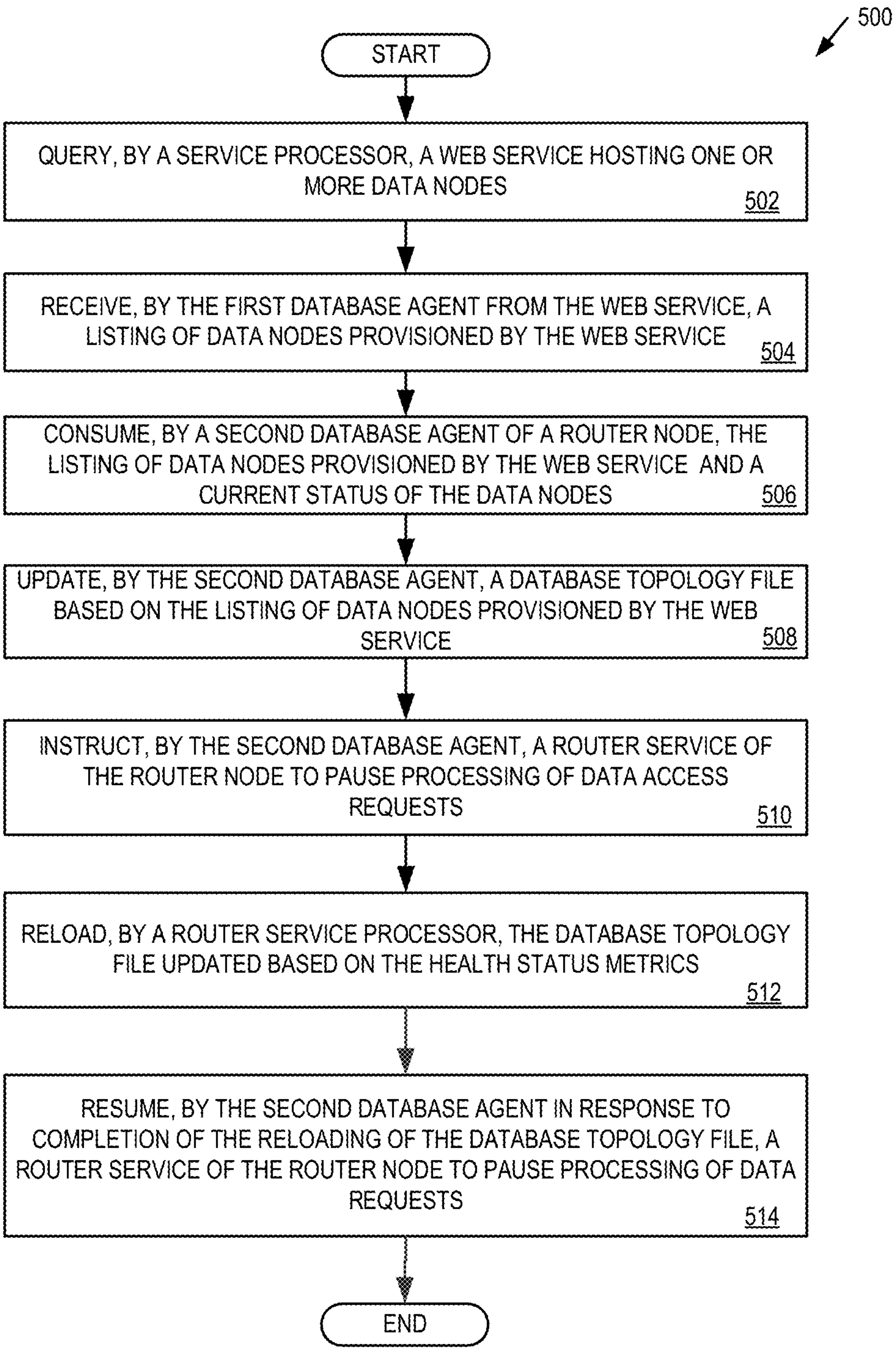
FIG. 5 is a flow diagram of another embodiment of a method for updating a distributed cache storage topology for a distributed cache nodes in a service provider system.

FIG. 5 is a flow diagram of another embodiment of a method 500 for updating a distributed cache storage topology for a distributed cache nodes in a service provider system. The method 500 is performed by processing logic that may comprise hardware (circuitry, dedicated logic, etc.), software (such as is run on a general purpose computer system or a dedicated machine), firmware, or a combination. In one embodiment, the method 400 is performed by service query generator (e.g., service query generator 326-2) and a router node (e.g., router node 320).

Referring to FIG. 5, processing logic begins by querying, by a service processor, a web service hosting one or more data nodes (processing block 502). In an embodiment, the service processor is a service query generator (e.g., 326-2) that acts a control plane service of the distributed storage of the service provider system 110. That is, the service processor provides for various management and orchestration functions across the distributed data storage, such as provisioning new nodes to replace downed nodes, provisioning new clusters to replace old clusters, adding new clusters for new service systems or end-users, etc. As a control plane service, the service processor interacts with the web service system to request/query a current inventory of all data nodes owned by the service provider system 110, to obtain a single global view of data node health status. In embodiments, and as discussed herein, the queries may be issued periodically, such as at different and less frequent periodic intervals to the router node queries discussed above. Processing logic receives, by the first database agent from the web service, a listing of data nodes provisioned by the web service (processing block 504).

Processing logic consumes, by a second database agent of a router node, the listing of data nodes provisioned by the web service and a current status of the data nodes (processing block 506). In an embodiment, the router node is one of the plurality of router nodes within the distributed storage system of the service provider system. Furthermore, as discussed herein, the current data node statuses are provided to all router nodes, which forms a single source of truth of a current data node health status.

Then, similar to the discussion above, processing logic updates, by the second database agent, a database topology file based on the listing of data nodes provisioned by the web service (processing block 508), instructs, by the second database agent, a router service of the router node to pause processing of data access requests (processing block 510), reloads, by a router service processor, the database topology file updated based on the health status metrics (processing block 512), and resumes, by the second database agent in response to completion of the reloading of the database topology file, a router service of the router node to pause processing of data requests (processing block 514). As discussed above, the service processor acting as a control plane service is able to obtain a global health status corresponding to a current inventory of data nodes of a service provider system. This health status is then pushed to all router nodes so that each router node within the distributed storage system of the service provider system performs processing blocks 506-514 resulting in a global router node topology update. Because the update is global, in the embodiment of FIG. 5, consistency of topology file configurations is maintained across router nodes, and accordingly routing decision consistency is also maintained.

Figure 6:
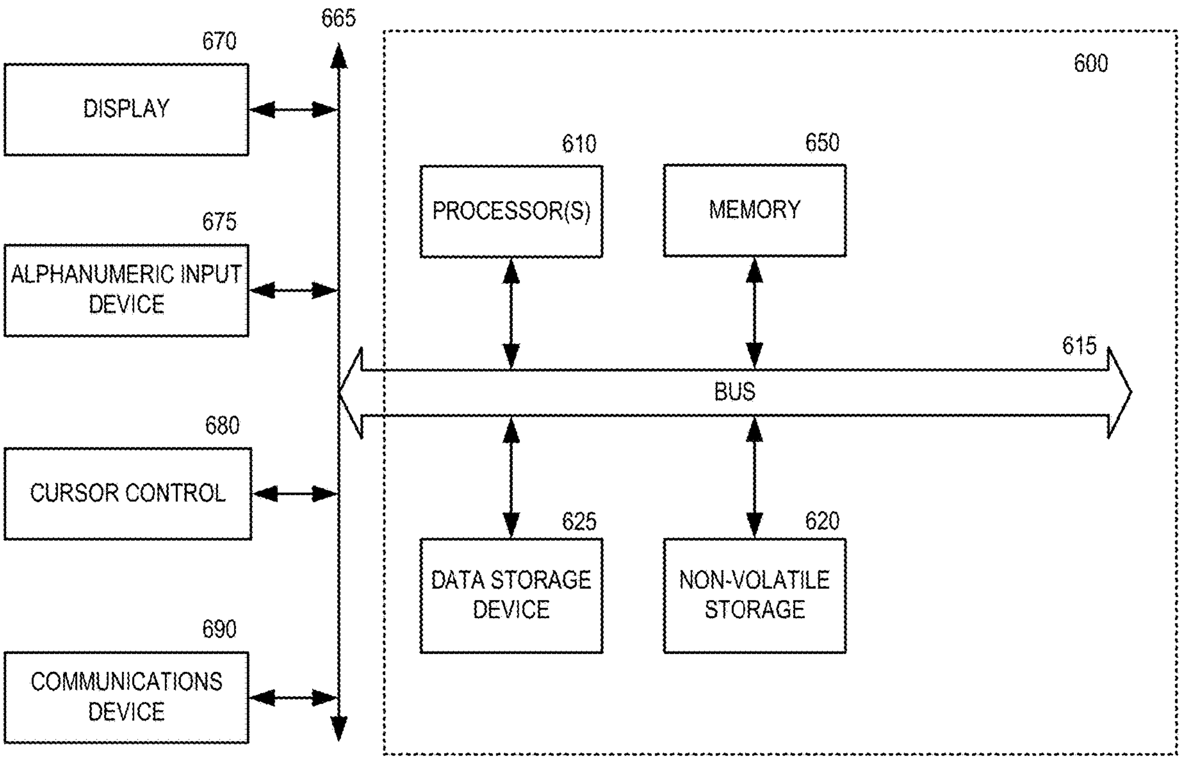
FIG. 6 is one embodiment of a computer system that may be used to support the systems and operations discussed herein.

FIG. 6 is one embodiment of a computer system that may be used to support the systems and operations discussed herein. For example, the computer system illustrated in FIG. 6 may be used by a commerce platform system, a merchant development system, merchant user system, etc. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for a control plane service updating data router nodes in a distributed data storage system, comprising:

querying, by a control plane service processor of the distributed data storage system, a web service for a listing of data nodes provisioned by the web service;

receiving, by the control plane service processor from the web service, the listing of data nodes provisioned by the web service and a current status of the data nodes;

providing, from the control plane service processor to a first database agent of a router node of the distributed data storage system, the listing of data nodes with the current status of the data nodes, wherein a second database agent of the router node consumes the listing of data nodes and the current status of the data nodes and updates a database topology file based on the current status of the data nodes in the listing of data nodes provisioned by the web service; and causing, by the control plane service processor, the router node to update the database topology file, wherein causing the router node to update the database topology file comprises:

processing, by a data routing service executed by the router node, data access requests received before initiation of the updating of the database topology file with an existing copy of the database topology file;

pausing processing, by the data routing service, of data access requests received after initiation of the updating of the database topology file until an updated database topology file is loaded to the data routing service;

loading, by the data routing service, the updated database topology file; and processing, by the data routing service in response to completion of the loading of the updated database topology file, the data access requests received after initiation of the updating of the database topology file.

2. The method of claim 1, wherein the querying of the web service by the control plane service processor is performed periodically at a first frequency, wherein the receiving of the current status of the data nodes by the control plane service processor is performed periodically at a second frequency, and wherein the first frequency and the second frequency are different.

3. The method of claim 2, wherein the first frequency is less than the second frequency.

4. The method of claim 1, further comprising:

provisioning, by the control plane service processor via the web service, a new data node to replace a data node in the listing of data nodes that is determined to be unavailable for routing;

causing, by the control plane service processor, data associated with the data node in the listing of data nodes that is determined to be unavailable for routing to be populated to the new data node; and assigning, by the control plane service processor, the new data node to a position within an ordering of data nodes in the database topology file.

5. The method of claim 4, wherein assigning the new data node comprises assigning a network address of the new data node to the position within the ordering of data nodes in the database topology file.

6. The method of claim 1, further comprising:

initiating, by the control plane service processor, a global router node topology update by providing topology information identifying the data nodes and the current status of the data nodes to router nodes of the distributed data storage system, thereby causing each router node to update its database topology file.

7. The method of claim 6, wherein initiating the global router node topology update further comprises:

distributing, by the control plane service processor, the topology information identifying the data nodes and the current status of the data nodes to each of the router nodes as a single source of truth; and causing each of the router nodes, in response to receiving the topology information, to pause processing of data access requests and load a corresponding updated database topology file, such that routing consistency is maintained across the router nodes.

8. The method of claim 1, wherein the distributed data storage system stores data of end users of a distributed services system, wherein the data access requests are requests of services to access end user data routed by the router node to one or more data nodes, and wherein the database topology file defines, for each end user of the distributed services system, routing topology information comprising a cluster of data nodes at which end user data is stored, network addresses of each of the data nodes, and an ordering of the data nodes forming the cluster.

9. The method of claim 8, wherein the current status of the data nodes comprises a system-wide routing eligibility status determined by the control plane service processor based on a current inventory of data nodes available for routing within the distributed data storage system.

10. The method of claim 8, wherein the distributed data storage system comprises a plurality of clusters of data nodes, and wherein no two end users have data stored in the same cluster of data nodes.

11. The method of claim 1, wherein the updated database topology file includes a version identifier, and wherein causing the router node to update the database topology file further comprises:

generating the updated database topology file by the second database agent prior to notifying the data routing service that the updated database topology file is available;

notifying, by the second database agent, the data routing service that the updated database topology file is available for loading;

continuing to process data access requests using the existing copy of the database topology file when the updated database topology file is not successfully loaded by the data routing service; and resuming processing of the paused data access requests only after the updated database topology file is successfully loaded by the data routing service.

12. The method of claim 1, wherein updating the database topology file comprises preserving an ordering position of a data node within the database topology file when a replacement data node is assigned, such that a deterministic routing algorithm executed by the data routing service continues to map existing data keys to a same ordinal position within the ordering before and after the updating.

13. A non-transitory machine readable medium, having instructions stored thereon, which when executed by a processing system, cause the processing system to perform operations for a control plane service updating data router nodes in a distributed data storage system, the operations comprising:

querying, by a control plane service processor of the distributed data storage system, a web service for a listing of data nodes provisioned by the web service;

receiving, by the control plane service processor from the web service, the listing of data nodes provisioned by the web service and a current status of the data nodes;

providing, from the control plane service processor to a first database agent of a router node of the distributed data storage system, the listing of data nodes with the current status of the data nodes, wherein a second database agent of the router node consumes the listing of data nodes and the current status of the data nodes and updates a database topology file based on the current status of the data nodes in the listing of data nodes provisioned by the web service; and causing, by the control plane service processor, the router node to update the database topology file, wherein causing the router node to update the database topology file comprises:

processing, by a data routing service executed by the router node, data access requests received before initiation of the updating of the database topology file with an existing copy of the database topology file;

pausing processing, by the data routing service, of data access requests received after initiation of the updating of the database topology file until an updated database topology file is loaded to the data routing service;

loading, by the data routing service, the updated database topology file; and processing, by the data routing service in response to completion of the loading of the updated database topology file, the data access requests received after initiation of the updating of the database topology file.

14. The non-transitory machine readable medium of claim 13, wherein the querying of the web service by the control plane service processor is performed periodically at a first frequency, wherein the receiving of the current status of the data nodes by the control plane service processor is performed periodically at a second frequency, and wherein the first frequency and the second frequency are different.

15. The non-transitory machine readable medium of claim 13, the operations further comprising:

provisioning, by the control plane service processor via the web service, a new data node to replace a data node in the listing of data nodes that is determined to be unavailable for routing;

causing, by the control plane service processor, data associated with the data node in the listing of data that is determined to be unavailable for routing to be populated to the new data node; and assigning, by the control plane service processor, the new data node to a position within an ordering of data nodes in the database topology file.

16. The non-transitory machine readable medium of claim 13, the operations further comprising:

initiating, by the control plane service processor, a global router node topology update by providing topology information identifying the data nodes and the current status of the data nodes to router nodes of the distributed data storage system, thereby causing each router node to update its database topology file.

17. A distributed service provider system having a plurality of computer processing systems at which data nodes and router nodes are executed, the service provider system configured to:

query, by a control plane service processor of a distributed data storage system of the distributed service provider system, a web service for a listing of data nodes provisioned by the web service;

receive, by the control plane service processor from the web service, the listing of data nodes provisioned by the web service and a current status of the data nodes;

provide, from the control plane service processor to a first database agent of a router node of the distributed data storage system, the listing of data nodes with the current status of the data nodes, wherein a second database agent of the router node consumes the listing of data nodes and the current status of the data nodes and updates a database topology file based on the current status of the data nodes in the listing of data nodes provisioned by the web service; and cause, by the control plane service processor, the router node to update the database topology file, wherein causing the router node to update the database topology file comprises:

processing, by a data routing service executed by the router node, data access requests received before initiation of the updating of the database topology file with an existing copy of the database topology file;

pausing processing, by the data routing service, of data access requests received after initiation of the updating of the database topology file until an updated database topology file is loaded to the data routing service;

loading, by the data routing service, the updated database topology file; and processing, by the data routing service in response to completion of the loading of the updated database topology file, the data access requests received after initiation of the updating of the database topology file.

18. The distributed service provider system of claim 17, wherein the querying of the web service by the control plane service processor is performed periodically at a first frequency, wherein the receiving of the current status of the data nodes by the control plane service processor is performed periodically at a second frequency, and wherein the first frequency and the second frequency are different.

19. The distributed service provider system of claim 17, wherein the service provider system is further configured to:

provision, by the control plane service processor via the web service, a new data node to replace a data node in the listing of data nodes that is determined to be unavailable for routing;

cause, by the control plane service processor, data associated with the data node in the listing of data nodes that is determined to be unavailable for routing to be populated to the new data node; and assign, by the control plane service processor, the new data node to a position within an ordering of data nodes in the database topology file.

20. The distributed service provider system of claim 17, wherein the service provider system is further configured to:

initiate, by the control plane service processor, a global router node topology update by providing topology information identifying the data nodes and the current status of the data nodes to router nodes of the distributed data storage system, thereby causing each router node to update its database topology file.

* * * * *